3,265,633
ANTIOXIDANTS
Lee R. Mahoney, Garden City, Mich., assignor to Ford Motor Company Dearborn, Mich., a corporation of Delaware
No Drawing. Filed June 7, 1963, Ser. No. 286,179
2 Claims. (Cl. 252—404)

This invention relates to the use of antioxidants for the preservation of organic compounds from harmful oxidation. This invention is more particularly concerned with the extraordinary properties of a class of compounds known as hydroxypyrenes for this purpose.

The particular compounds of this class which have been found to be particularly effective are 3-hydroxypyrene and 3,10-dihydroxypyrene. These compounds may be represented as follows:

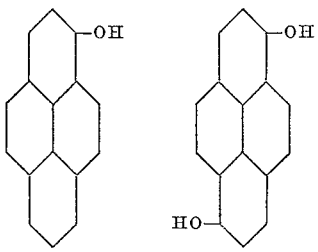

The preparation of these compounds is described in Ann. 531, pages 1 to 159 (1937), by Vollman, Becker, Corell and Struck.

The efficiencies of the hydroxypyrene derivatives as antioxidants were determined as follows: A solution of a standard reactive hydrocarbon containing a free radical initiator was thoroughly agitated in an atmosphere of oxygen and the rate of oxygen absorption was determined. For this work, 9,10-dihydroanthracene was used as the reference hydrocarbon, chlorobenzene was used as the solvent, and the free radical initiator was azobis-isobutyronitrile (AIBN) [also known as 2,2'-azobis-(2-methylpropionitrile)]. The rates of oxygen absorption were determined both in the presence and in the absence of the inhibitor. For comparison, hydroquinone and 2,6-ditertiary-butyl-4-methyl phenol were included in this study. The results of these experiments are presented in the following table. A decrease in the rate of absorption of oxygen indicates an increase in the effectiveness of the antioxidant. It is clear from the data presented in the following table that the hydroxypyrene compounds are extremely effective antioxidants. At equal concentrations 3-hydroxypyrene is about forty times as effective as 2,6-ditertiary-butyl-4-methyl phenol and the 3,10-dihydroxypyrene is several hundred times as effective. Compared to hydroquinone, the 3-hydroxypyrene is five times more effective and the 3,10-dihydroxypyrene is forty times more effective at the same concentration.

*Initial rates of oxygen absorption at 60° C.*

9,10-dihydroanthracene_____ 0.577 M
AIBN_____ 0.075 M

| Inhibitor and Concentration | | Rate of Oxygen Absorption $\times 10^7$ moles/ lit.-sec. | Time of Inhibition,[1] mins. |
|---|---|---|---|
| None | | 500.0 | |
| I | 2,6-tertiary-butyl-4-methyl phenol $(0.52 \times 10^{-3}$ M). | 249.0 | 13 |
|  | 2,6-tertiary-butyl-4-methyl phenol $(1.56 \times 10^{-3}$ M). | 109.0 | 40 |
| II | Hydroquinone $(1.1 \times 10^{-3}$ M) | 20.0 | 26 |
| IIIa | 3-hydroxypyrene $(0.46 \times 10^{-3}$ M), $(1.37 \times 10^{-3}$ M). | 10.5<br>3.8 | 18<br>56 |
| IIIb | 3,10-dihydroxypyrene $(1.23 \times 10^{-3}$ M), $(1.07 \times 10^{-3}$ M). | [2]<br>ca. 0.4 | 30<br>26 |

[1] Time necessary to assume the normal rate.
[2] Smaller than 1.0.

I claim:
1. The process of stabilizing a normally oxidizable organic compound against oxidation comprising adding to such oxidizable organic compound a small but effective amount of 3-hydroxypyrene.
2. The process of stabilizing a normally oxidizable organic compound against oxidation comprising adding to such oxidizable organic compound a small but effective amount of 3,10-dihydroxypyrene.

References Cited by the Examiner
UNITED STATES PATENTS
2,228,667  1/1941  Martin _____ 99—163 XR
2,698,247  12/1954 Thompson _____ 44—78 XR
3,047,503  7/1962  Jaffe et al. _____ 252—404 XR LEON D. ROSDOL, *Primary Examiner.*
JULIUS GREENWALD, ALBERT T. MEYERS,
*Examiners.*
K. W. VERNON, J. D. WELSH, *Assistant Examiners.*